The present invention relates to the method and apparatus for continuously treating a gas stream. More particularly, the present invention relates to a method and apparatus for continuously removing moisture and impurities from a circulating atmosphere.

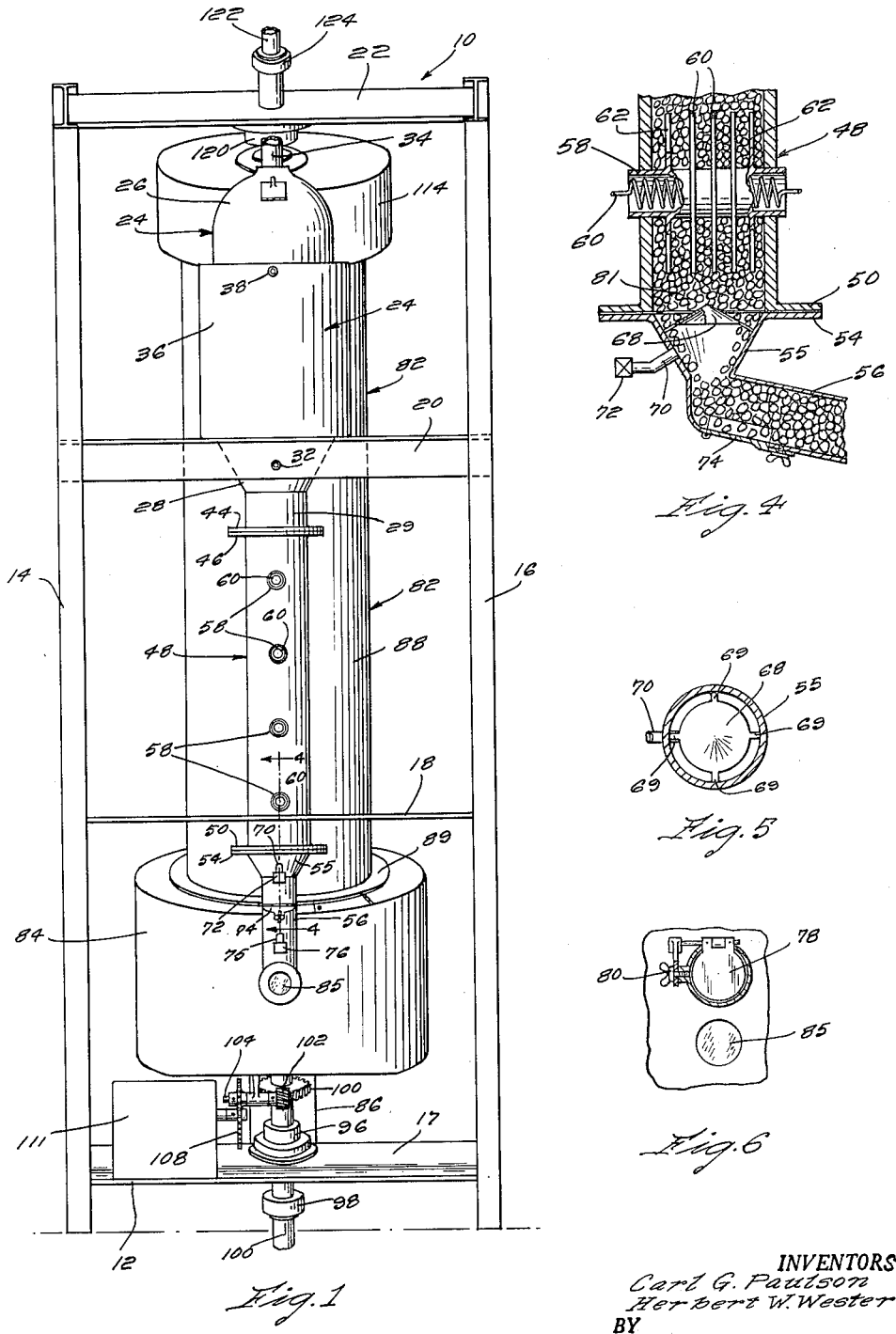

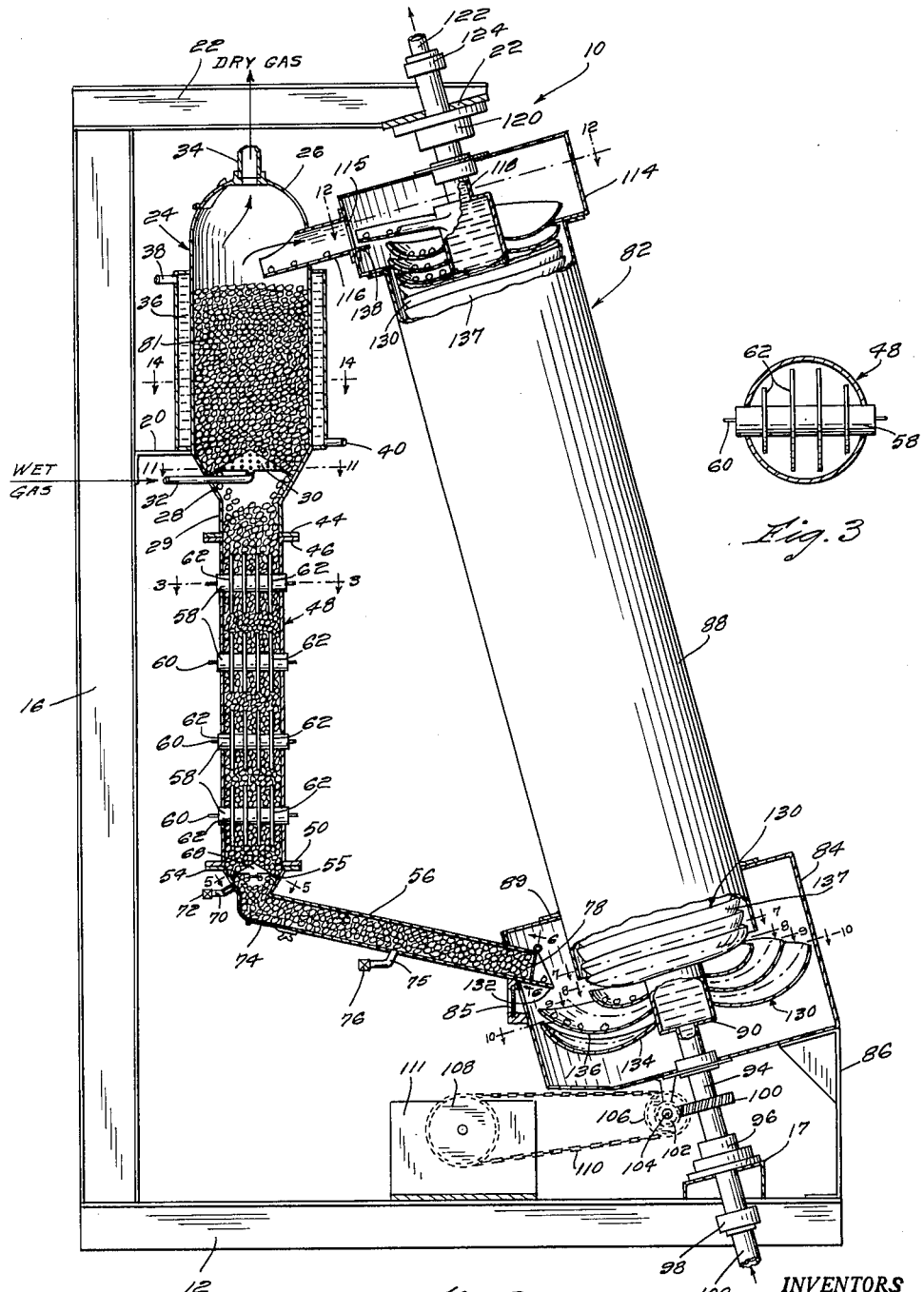

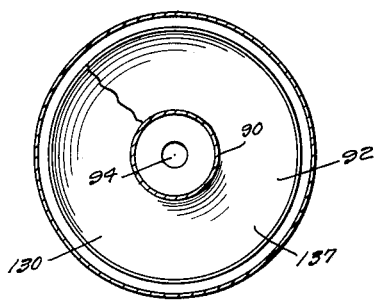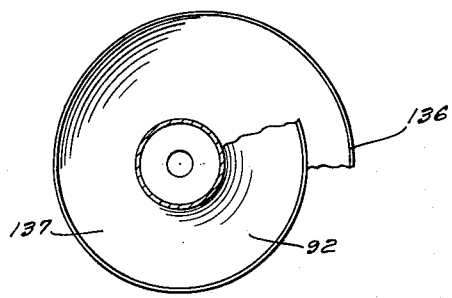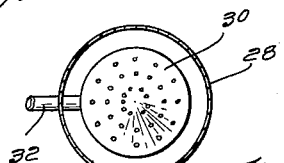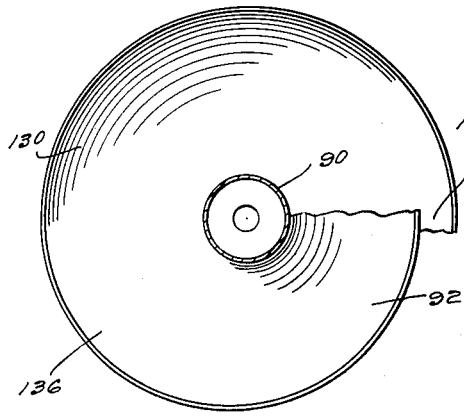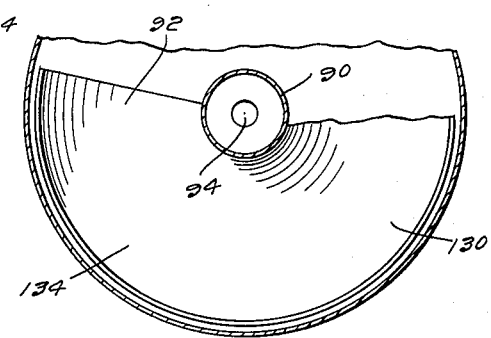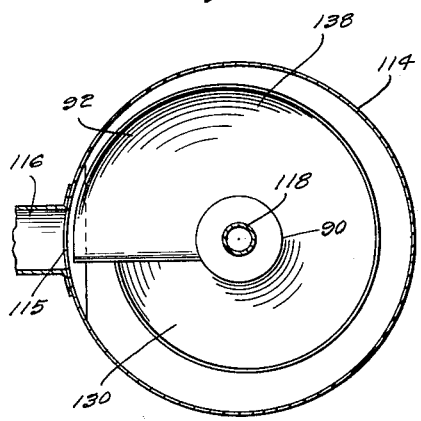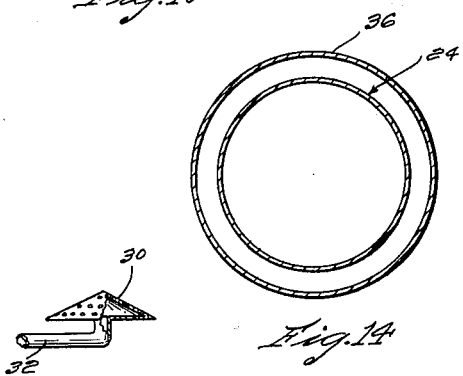

The present invention has particular application in the conditioning of gases which in the specialized use thereof require that they either by completely dry or free from certain reacting chemicals. In one form of such use an atmosphere containing hydrogen is employed in the heat treatment of metals. It is essential that when an atmosphere is used in the heat treatment of metals such as high speed steels and the like, moisture and other impurities that might result in contamination of the work being heat treated must be removed from the atmosphere. Prior to the instant invention, it has been the standard practice to dehumidify heat treatment atmospheres by passing the atmosphere through a drying chamber in which a desiccant material is located, the desiccant material thereby acting to absorb the moisture and impurities from the gas stream, wherein the atmosphere is substantially dried prior to passing to the point of use thereof. Depending on certain factors, such as the rate of flow of the atmosphere, the moisture content thereof, and the size and temperature of the desiccant chamber, the desiccant, during the atmosphere treating process, will eventually become saturated, at which point it is then necessary to reactivate the desiccant by removal of the moisture and impurities therefrom. Obviously, if this is not done, the desiccant will be incapable of drawing off further moisture from the gases passing therethrough and hence will become ineffective for its intended purpose. Since desiccants will not absorb or retain moisture at relatively high temperatures, reactivation or regeneration thereof may be accomplished by heating the desiccant, thereby releasing the absorbed moisture. After the heated desiccant has been purged of its moisture by a regulated gas flow, it is then cooled and allowed to resume its absorbing function.

The problem in the prior known dryer was in the reactivation or regeneration of the desiccant material since a prescribed cycle of operation was necessary in order to properly reactivate the desiccant for continuation of the treatment process. Since desiccants are poor conductors of heat, it is difficult to effectively and uniformly heat the desiccant in a reasonable period of time. Moreover, the desiccant has to be cooled and purged of its moisture, but because of the poor conductive characteristics thereof, rapid cooling is difficult to achieve. In the patent to Westeren #2,975,860, the difficulties associated with the prior known apparatus for drying heat treatment atmospheres were discussed, and apparatus was disclosed in this patent that was designed to reduce the time required for reactivating or regenerating the desiccant material used in the drying operation. The drying apparatus described in the patent included identical chambers containing a desiccant material that was adapted to treat an atmosphere, the chambers being located in parallel relation with respect to the flow of atmosphere therethrough. A valve assembly interconnected to the chambers was provided so that one of the chambers was employed in the treatment of the atmosphere while the other was being used to reactivate or regenerate the desiccant material therein. As soon the desiccant material in the chamber used for conditioning the atmosphere became saturated, the valve assembly was actuated to reverse the flow of the atmosphere, whereupon the chamber containing the saturated desiccant material was heated to reactivate the saturated desiccant material while the chamber containing the reactivated desiccant material was employed in the atmosphere drying operation.

The apparatus disclosed in Patent #2,975,860 has been operated satisfactorily and has greatly reduced the problems encountered in the prior known atmosphere drying apparatus. However, the successful operation of the dual atmosphere dryer as illustrated in the aforesaid patent depended upon cycling of the chambers and the actuation of the valve assembly associated therewith. The present invention is designed to eliminate the use of individual chambers and the valves associated therewith and provides for the continuous conditioning of an atmosphere together with the continuous reactivation or regeneration of a moving bed of desiccant material. Transfer means in the form of a unique elevator cooperates with a heating or regeneration chamber and an absorption chamber to define a closed system that eliminates the necessity for discontinuing the operation of a particular chamber as was done heretofore.

It is therefore an object of the present invention to provide atmosphere drying apparatus that is continuous in operation and that eliminates the requirement of blowers, heat exchangers, valves and other expensive and complicated equipment.

Another object of the invention is to provide apparatus for conditioning an atmosphere that includes a closed system, wherein the desiccant employed in the atmosphere conditioning operation is continuously reactivated, cooled and purged prior to introduction thereof into the atmosphere treatment chamber.

Another object is to provide a continuous atmosphere dryer wherein a moving bed of desiccant is continuously and successively regenerated or reactivated, cooled and purged to define a cycle of operation.

Another object is to teach a method of continuously drying a moving bed of desiccant that is employed in the conditioning of a circulating atmosphere.

Another object is to provide atmosphere drying apparatus that includes a novel elevator that continuously transfers a desiccant material to an absorption chamber after the reactivation of the desiccant material in a heating chamber.

Still another object is to provide a novel elevator for use in the continuous atmosphere drying system that includes means for cooling a desiccant after the reactivation thereof.

Still another object is to provide a transfer device having a continuously rotating helical member that is adapted to vertically lift a plurality of spherical articles to a point of use thereof.

Other objects, features and advantages of the invention will become apparent as the description thereof proceeds when considered in connection with the accompanying illustrative drawings.

In the drawings which illustrate the best mode presently contemplated for carrying out the instant invention:

FIG. 1 is an elevational view of the apparatus for continously drying a circulating atmosphere that is embodied in the present invention;

FIG. 2 is a vertical sectional view of the apparatus illustrated in FIG. 1 with parts shown in elevation;

FIG. 3 is a sectional view taken along lines 3—3 in FIG. 2;

FIG. 4 is a sectional view taken along lines 4—4 in FIG. 1;

FIG. 5 is a sectional view taken along lines 5—5 in FIG. 2;

FIG. 6 is a sectional view taken along lines 6—6 in FIG. 2;

FIG. 7 is a sectional view taken along lines 7—7 in FIG. 2;

FIG. 8 is a sectional view taken along lines 8—8 in FIG. 2;

FIG. 9 is a sectional view taken along lines 9—9 in FIG. 2;

FIG. 10 is a sectional view taken along lines 10—10 in FIG. 2;

FIG. 11 is a sectional view taken along lines 11—11 in FIG. 2;

FIG. 12 is a sectional view taken along lines 12—12 in FIG. 2;

FIG. 13 is an enlarged side elevational view with parts shown in section of the atmosphere inlet cone illustrated in FIG. 2; and FIG. 14 is a sectional view taken along lines 14—14 in FIG. 2.

Referring now to the drawings and particularly to FIGS. 1 and 2, the apparatus for continuously drying an atmosphere is illustrated and is generally indicated at 10. The apparatus 10 includes a frame structure defined by a base 12, vertical standards 14 and 16 that are secured to the base 12, and cross members 17, 18, 20 and 22 that are connected between the vertical standards 14 and 16 and that are adapted to support the various components of the drying apparatus embodied herein. The relationship of each of the cross members 17, 18, 20 and 22 will be described in connection with the various components of the drying apparatus.

Secured to the cross member 20 is a cylindrical adsorption chamber generally indicated at 24 that has a generally dome-shaped top 26 and a generally truncated bottom 28 that terminates in a lower neck section 29. Mounted within the truncated bottom 28 of the cylindrical adsorption chamber 24 is a gas inlet cone 30 which as shown in FIGS. 11 and 13 is hollow and is provided with a plurality of holes in the upper surface thereof for admitting an atmosphere to be conditioned into the adsorption chamber 24. The interior of the gas inlet cone 30 communicates with an inlet pipe 32 that is adapted to conduct the atmosphere to be conditioned from the point of use to the adsorption chamber 24. The inlet pipe 32 is suitably interconnected to any convenient equipment in which the atmosphere is used, such as a furnace that is employed in the heat treatment of metals. Joined to the uppermost end of the dome-shaped top 26 of the adsorption chamber 24 and interconnected to the aforesaid furnace is a discharge pipe 34 that is adapted to conduct the conditioned atmosphere to the furnace for use therein. It is seen that the impure or saturated gas to be conditioned is continuously circulated into the adsorption chamber 24 by way of the pipe 34 and through the gas inlet cone 30. After the gas is conditioned within the adsorption chamber 24, it passes through the discharge pipe 34 and is then returned to the point of use. In order to maintain the walls of the adsorption chamber at a relatively constant temperature and to conduct away any heat generated during the conditioning of the atmosphere, an annular water jacket 36 is provided and surrounds a substantial portion of the cylindrical part of the adsorption chamber. A water inlet pipe 38 and a water outlet pipe 40 are joined to the jacket 36 and provide for continuous flow of cooling water through the jacket 36.

Formed on the lower end of the neck section 29 of the adsorption chamber 24 is a flange 44 that is secured to a flange 46 that forms the upper part of a cylindrically formed regeneration or reactivation chamber generally indicated at 48. The reactivation chamber 48 is secured to the cross member 18 and is generally of the same diameter as the reduced neck section 29. A lower flange 50 is joined to the lower end of the chamber 48 and is secured to a flange 54 formed in an upwardly extending frusto-conical portion 55 that is formed as part of a conductor tube 56. As shown in FIG. 2, a plurality of vertically spaced and aligned open-ended pipes 58 extend transversely of the reactivation chamber 48 and project through the walls thereof. Extending through the pipes 58 are helically formed heating coils 60 which may be energized by any suitable means (not shown). Secured to each of the pipes 58 are a plurality of radiation fins 62 that are mounted in closely spaced relation and are arranged so as to substantially span the chamber 48. Although the tubes 58 are illustrated as being open ended, it is understood that they may be closed if it is so desired in order to increase the efficiency of the heating operation within the chamber 48.

Although not shown, it is contemplated to utilize other apparatus and techniques for heating the reactivation chamber. One such modified heating technique includes the use of a wave guide tube that surrounds the chamber 48 and has a quartz material disposed therein. An electronic device may then be utilized to heat the quartz material by microwaves to cause the chamber to reach the prescribed temperatures.

Referring again to FIGS. 2 and 4, the major portion of the conductor tube 56 is shown as an elongated cylinder that is inclined with respect to the horizontal. A distribution cone 68 is mounted within the frusto-conical portion 55 of the conductor tube 56 and has a spider construction that includes spaced arms 69 that are secured to the side walls of the frusto-conical portion. The cone 68 is also adapted to control the flow of the desiccant mass into the tube 56 so as to prevent the funneling of the desiccant therein. A vent tube 70 communicates with the frusto-conical portion 55 and has a vent valve 72 is joined thereto that acts to vent the wet gases and impurities removed from the desiccant material in the reactivation chamber 48. Located in the elongated cylindrical tube 56 adjacent the upper end thereof is a trap door 74 that may be opened to release the desiccant material from the adsorption and reactivation chamber when the apparatus is inactive. As seen in FIG. 2, a second vent tube 75 communicates with the elongated tube 56 approximately intermediate the ends thereof to which a vent valve 76 is joined for venting purge gases back flowing through the elevator as will be described hereinafter.

Referring now to FIGS. 2 and 6, a check valve 78 is shown hingedly connected to the lowermost end of the tube 56 and is adapted to be moved outwardly when the desiccant mass is discharged from the tube 56. As seen in FIG. 6, a lock 80 is provided for securing the check-valve 78 in the locked position thereof when the apparatus is shut down, and will thereby act to retain the desiccant in the tube 56, reactivation chamber 48 and adsorption chamber 24 when the apparatus is inactive.

As will be described in the operation of the apparatus embodied herein, a moving bed or mass of desiccant indicated at 81 in FIG. 2 and comprised of a plurality of spherical pellets, is continuously circulated in a closed system that is defined by the adsorption chamber 24, reactivation chamber 48, conductor tube 56 and an elevator generally indicated at 82. Thus the desiccant material 81 that is utilized to condition the atmosphere during the passage thereof through the adsorption chamber 24 is heated for reactivation in the chamber 48 and is then moved through the tube 56 for deposit onto the elevator 82, which as will be described elevates the desiccant material for reentry into the adsorption chamber 24. The circulation of the desiccant material 81 is continuous and is dependent on the unique operation of the elevator 82, which, as will be described, takes advantage of the spherical characteristics of the desiccant pellets for elevating the desiccant from their point of entry at the lower end of the elevator to the adsorption chamber 24.

Referring again to FIG. 2, the elevator 82 is shown including a lower receptacle 84 that is hollow in construction and that is mounted on a reduced standard 86 that is joined to the base 12. The axis of the receptacle 84 is inclined with respect to the vertical and a view port 85 is formed in a side wall of the receptacle through which the operator may visually inspect the operation of the elevator 82. The view port 85 is located just below an opening in the wall of the receptacle through which the tube 56 extends. It is seen that the check valve 78 that is hingedly secured to the tube 56 is located interiorly of the receptacle 84 in the position of use thereof and that the desiccant material discharged through the tube 56 is deposited within the receptacle and onto the lower end of the elevating mechanism of the elevator 82. Extending through the upper wall of the receptacle 84 and into the interior thereof is a cylindrical housing 88, the axis of which is also inclined and which is generally coaxial with that of the receptacle 84. The housing 88 is secured within the receptacle, as illustrated, by any convenient means such as bracket 89 and will be suitably braced at the upper end thereof as will be described. Mounted for rotation within the housing 88 is a helical member that includes a hollow central column 90 and a helically extending ramp or track 130 that is joined directly to the central column 90. A hollow shaft 94 is joined to the lowermost end of the central column 90 and extends through the bottom wall of the receptacle 84 and through the cross member 17 on which a support bearing assembly 96 is mounted. The outer end of the hollow shaft 94 is connected to a swivel coupling 98 and communicates therethrough with a cooling fluid inlet pipe 100 that directs cooling fluid into the column 90. In order to rotate the shaft 94, a gear drive is provided and includes a gear 100 joined thereto. The gear 100 is connected to a worm 102 mounted on a shaft 104. A pulley 106 is secured to the shaft 104 and is connected to a drive pulley 108 through a chain 110. Any conventional motor may be mounted on the base 12 for driving the pulley 108 through a gear reduction 111 to produce the necessary rotation of the shaft 94.

The uppermost end of the housing 88 has an enlarged portion 114 joined thereto, the enlarged portion 114 having an opening 115 formed in the lower side wall thereof for receiving a transfer tube 116 therein. The other end of the transfer tube 116 extends through an opening formed in the adsorption chamber 24, the transfer tube 116 being downwardly inclined from the enlarged portion 114 to the adsorption chamber 24 so as to provide for the return of the desiccant pellets into the adsorption chamber 24. The lower portion of the transfer tube 116 is also elongated for being received substantially within the enlarged portion 114 and the adsorption chamber 24 and defines the surface onto which the desiccant pellets are deposited at the top end of the elevator 82. Since this surface is inclined the pellets roll by gravity downwardly from the elevator into the adsorption chamber 24 and onto the desiccant bed contained therein.

The uppermost end of the column 90 of the elevator 82 has a hollow shaft 118 joined thereto that extends through the upper wall of the enlarged portion 114. A bearing assembly 120 is mounted on the cross member 22 and receives the hollow shaft 118 for rotation therein. The hollow shaft 118 also communicates with a discharge pipe 122 through a swivel coupling 124 that provides for rotation of the shaft 118 with respect to the discharge pipe 122. It is seen that the cooling fluid, such as water, is introduced into the tubular column by way of the shaft 94 and is circulated in the column for discharge through the hollow shaft 118. As will be described, the cooling fluid provides for the effective cooling of the desiccant pellets that are discharged from the reactivation chamber 48 into the lower end of the elevator 82. Thus as the pellets are progressively advanced to the top of the elevator they are effectively cooled prior to the reentry thereof into the top of the adsorption chamber.

The elevator 82 has a unique design that takes advantage of the generally spherical configuration of the desiccant pellets for the transfer thereof from the lowermost end of the elevator to the top thereof and deposit into the adsorption chamber 24. Joined directly to the column 90 is a helically extending ramp or track 130, the cross sectional configuration of which is generally concave. Since the axis of the column 90 is generally inclined with respect to the vertical, the axis of the helically extending track 130 is also inclined. It will be noted that the lowest section 134 of the helical track 130 and the section thereabove indicated at 136 are enlarged with respect to the remaining sections of the track. It is apparent that the enlarged sections provide for catching the desiccant pellets as they flow by the valve 78 and drop into the receptacle 84. The interconnection of the sections of the helical track 130 are shown in FIGS. 7 through 10, each section of the track contained in the housing 88 being indicated at 137.

Upon referring to FIG. 2, it will be seen that the inclination of the helical track 130 may be further defined by noting that the bottommost edges of each section of the track 130, when viewed in cross section, are contained in a plane that is inclined with respect to the vertical, an acute angle being defined by such a plane and the axis of the column 90. The acute angle as defined may vary to some degree but best results are obtained with the elevator being inclined as illustrated. It is this inclination, combined with the helical formation of the track 130, that provides for the unique feeding or transfer action of the desiccant pellets. Secured to the check valve 78 and formed as an extension thereof is a ramp 132 that directs the desiccant pellets discharging through the valve 78 onto the lower section 136 of the helical track 130. Since the helical track is inclined, the pellets introduced thereon will tend to seek the lowest level thereof. As seen in FIG. 2, the left side of the track 130 is lower than the right, and thus the pellets deposited onto the track will gravitate to the lower or left side thereof. It is seen that the concave configuration of the track and the spherical configuration of the desiccant pellets cooperate to insure that the pellets will always seek the left side of the track. The concave configuration of the track also tends to prevent the pellets from sliding over the edge thereof during the elevation of the pellets to the top of the elevator. As the elevator track 130 is rotated in a counterclockwise direction, the desiccant pellets will follow the helical inclination thereof. Since the pellets are generally spherical, frictional resistance therebetween and the track walls is at a minimum and the pellets will tend to remain in the lower side of the elevator. However, since the track is helical in formation, the pellets must follow the track configuration as it rotates in a counterclockwise direction. In effect, the pellets appear to walk upwardly on the track and are thus transferred to the top of the elevator track, at which point they are deposited on a guide member 138 that directs them to the transfer tube 116. It is seen that the transfer action is achieved because of the track inclination, the counterclockwise rotation of the track and because of the rolling action of the pellets. As the helical track rotates counterclockwise, the pellets will seek to remain on the left or lower side of the track. However, since the track is helically formed, the pellets will be carried upwardly until they are discharged into the guide member 138.

The unique operation of the elevator provides for the continuous drying of the atmosphere introduced into the adsorption chamber 24, since the desiccant material is continuously reactivated and returned to the adsorption chamber 24. Although the process of heating the wet desiccant material to remove the moisture and impurities therefrom is fairly evident from the above description, the complete cycle of operation of the system is also dependent upon the venting of the gases removed from the reactivated desiccant and upon purging the reactivated desiccant as it is elevated and cooled in the elevator 82.

After the desiccant material in the adsorption chamber 24 has conditioned the wet gas or atmosphere entering therein through the inlet pipe 32, the desiccant material becomes saturated and must be reactivated or regenerated before it can be efficiently used again. The removal of moisture from hydrogen bearing heat treatment atmosphere is well known in the art, and the desiccant type dryer known heretofore has been utilized to dry a heat treatment atmosphere such as dissociated ammonia and functions to absorb residual ammonia in a dissociated gas stream. The separation of carbon dioxide and water from nitrogen to provide so-called dry nitrogen is also known, and the apparatus embodied herein may not only be used to condition an atmosphere such as dissociated ammonia but may also be used to separate gases from an atmosphere. The reactivation process for drying a desiccant material employed in the separation of moisture and impurities from those gases above mentioned is generally known in the art as described. However, the present invention contemplates the continuous drying and reactivation of this desiccant material as opposed to the cyclic reactivation of the desiccant material as known in the prior known devices.

After the desiccant material 81 has removed the moisture from the atmosphere passing through the adsorption chamber 24 it moves by gravity into the reactivation chamber 48 where it is heated and the impurities and moisture removed therefrom. The wet gas removed from the desiccant pellets is then withdrawn through the vent 70 and valve 72. The desiccant pellets are continuously moved through the conductor tube 56 into the elevator 82 and are deposited onto the lower section of the track 130. While the desiccant pellets are being transferred from the lower section of the track 130 to the transfer tube 116, they are being cooled by the cooling fluid circulating through the column 90. It is known that there are some residual moisture and impurities remaining on the desiccant pellets after the heat treatment thereof during the reactivation or regeneration period. In order to purge the residual impurities and moisture from the pellets, a portion of the atmosphere that had been dried in the adsorption chamber 24 is allowed to enter the elevator housing by means of the transfer tube 116. The interior of the elevator housing is normally at a lower pressure than the adsorption chamber 24 and therefore will permit the circulation of a portion of the dried atmosphere therethrough. As the dry atmosphere circulates through the elevator housing 88 toward the bottom thereof, it will purge the desiccant pellets of the residual moisture and impurities. Thus a greater purifying or cleaning action of the desiccant pellets is achieved since the dry atmosphere acts to scavenge the impurities from the desiccant material. The dry atmosphere also acts as a seal to prevent any contaminated gas from entering the elevator housing through the lower end thereof. As described above, the contaminated gas is discharged through the vent 70 and valve 72. Since dry gas that has been employed for purging the residual impurities and moisture from the dessicant material is used as a seal to prevent entry of the wet gas into the elevator housing 88 it is discharged through the vent 75 and the valve 76 that is located in the conductor tube 56.

It is seen that the apparatus embodied herein is utilized to continuously condition an atmosphere for the removal of moisture and impurities therefrom. The desiccant material employed for conditioning of the atmosphere is continuously circulated in a closed system. The desiccant material is heated, cooled and purged prior to reintroduction into the adsorbent chamber. It is understood that the elevator 82 may be controlled to move the desiccant material at a rate that would be consistent with the flow thereof through the adsorbent chamber 24 and the heating chamber 48. The unique design of the elevator 82 providing for the transfer of the desiccant pellets from the lower to the upper end thereof requires few parts and depends only upon the rotation of the helical track 130. Since the desiccant pellets tend to accumulate on the lower side of the inclined helical track, they will be transferred upwardly to the upper end thereof for discharge into the adsorbent chamber 24. The system is operated substantially without valves to provide for the free flow of the wet and dried gases, although valves 72 and 76 are provided for the discharge of the wet gas and purge gas, respectively, and the swing check valve 78 is provided for controlling the flow of the desiccant material to the elevator 82. The gas inlet cone 30 is utilized to prevent the desiccant pellets from funneling into the heat chamber 48 and distributes pellets so as to provide an even flow along the side walls of the heating chamber 48 at the upper end thereof. The distribution cone or spider 68 also prevents funneling of the desiccant material from the heating chamber 48 into the conductor tube 56. The material thus is evenly distributed in the conductor tube 56 so that it will flow smoothly into the elevator 82. The flow of the purified gas through the elevator for purging the residue from the reactivated or regenerated desiccant avoids the introduction of an additional gas stream into the system and enables the system to be operated continuously and uniformly.

Although the desiccant pellets have been described as being spherical, it is understood that the pellets or any other article to be transferred by the elevator may have various geometrical designs. Even square-shaped articles could be transferred by the elevator, assuming that the articles would move relative to the surface of the elevator sections and that the inclination of the elevator was sufficient to provide for such relative movement.

While there is shown and described herein certain structure embodying the invention, it will be manifest to those skilled in the art that various modifications and rearrangements of the parts may be made without departing from the spirit and scope of the underlying inventive concept and that the same is not limited to the particular form herein shown and described except insofar as indicated by the scope of the appended claims.

What is claimed is:

1. In apparatus for continuously treating a circulating atmosphere, an adsorption chamber into which the atmosphere is introduced, a bed of desiccant material moving continuously by gravity through said adsorption chamber for removing moisture and impurities therefrom, a reactivation chamber located below said adsorption chamber and communicating therewith for receiving the desiccant material after it has removed the moisture and impurities from said atmosphere, means for heating the saturated and impure desiccant material in said reactivation chamber for separating the moisture and impurities therefrom, means located downstream of said reactivation chamber for venting the separated moisture and impurities therefrom, means for elevating the heated desiccant material to the upstream end of said adsorption chamber for reintroduction therein, the upper end of said elevating means communicating with said adsorption chamber for directing the reactivated and cooled desiccant material thereto, means for directing a portion of the treated and dried atmosphere into the upper end of said elevating means for circulation therein in counter-current flow to the desiccant material being elevated to the adsorption chamber, wherein the dried atmosphere further conditions and dries the reactivated desiccant material as it moves upwardly in said elevating means, conducting means communicating with the downstream end of said reactivation chamber and the lower end of said elevating means for directing the heated desiccant material thereto, means located in said conducting means for venting the dried gases that have passed downwardly through said elevating means, and means located in said elevating means for cooling the heated desiccant material simultaneously with the elevation thereof to the upstream end of said adsorption chamber.

2. In apparatus as set forth in claim 1, said elevating means including a continuous track having a helical configuration, the axis of which is inclined, said inclined helical track transferring the desiccant material introduced at the bottom of the elevating means in an upwardly direction to the top of said elevating means for reintroduction into said adsorption chamber, said cooling means and said elevating means being defined by a central chamber around which said helical track is disposed, a cooling fluid continuously circulating through said chamber for cooling the heated desiccant material as it is elevated by said helical track of said elevating means.

3. In a method of conditioning an atmosphere, comprising the steps of introducing the atmosphere into an adsorption chamber for the removal of moisture and impurities therefrom, continuously introducing a desiccant material into said adsorption chamber, and simultaneously removing the saturated desiccant material from said adsorption chamber and passing it downwardly into a heated reactivation chamber for the reactivation thereof, continuously moving the reactivated desiccant material to an elevator for the transfer thereof upwardly to said adsorption chamber and simultaneously cooling said desiccant material during the transfer thereof to said adsorption chamber, venting the wet gases removed from the saturated desiccant material during the reactivation thereof below the reactivation chamber, separating a portion of the dried atmosphere and circulating it downwardly through the reactivated material during the transfer thereof to said adsorption chamber for scavenging any impurities remaining in the desiccant material after the reactivation process, and venting the separated dried atmosphere at a point between the vent for the wet gases and the elevator.

References Cited by the Examiner

UNITED STATES PATENTS

| | | | |
|---|---|---|---|
| 352,394 | 11/1886 | Campbell | 198—213 X |
| 1,565,018 | 12/1925 | Lower | 198—213 X |
| 2,630,877 | 3/1953 | Berg | 55—79 X |
| 2,638,999 | 5/1953 | Berg | 55—34 X |
| 2,684,729 | 7/1954 | Berg | 55—79 X |
| 2,799,359 | 7/1957 | Johnson | 55—79 X |
| 2,925,928 | 2/1960 | Martin | 55—77 |

REUBEN FRIEDMAN, *Primary Examiner.*

J. ADEE, *Assistant Examiner.*